(12) United States Patent
Hobmeyr et al.

(10) Patent No.: US 8,561,453 B2
(45) Date of Patent: Oct. 22, 2013

(54) CALIBRATION OF ALL PRESSURE TRANSDUCERS IN A HYDROGEN STORAGE SYSTEM

(75) Inventors: Ralph Hobmeyr, Mainz-Kastel (DE); Björn Zörner, Trebur (DE); Heiko Hrobarsch, Wiesbaden (DE)

(73) Assignee: GM Global Technology Operations LLC, Detroit, MI (US)

(*) Notice: Subject to any disclaimer, the term of this patent is extended or adjusted under 35 U.S.C. 154(b) by 430 days.

(21) Appl. No.: 12/882,029

(22) Filed: Sep. 14, 2010

(65) Prior Publication Data
US 2012/0060584 A1    Mar. 15, 2012

(51) Int. Cl.
*G01L 27/00* (2006.01)
*F17C 13/02* (2006.01)

(52) U.S. Cl.
CPC .............. G01L 27/005 (2013.01); F17C 13/025 (2013.01)
USPC ........................................... 73/1.66; 137/552

(58) Field of Classification Search
CPC ....... F17C 13/02; F17C 13/025; G01L 27/00; G01L 27/005; G01L 27/02
USPC ................ 73/1.57, 1.59–1.64, 1.66; 137/552; 429/90
See application file for complete search history.

(56) References Cited

U.S. PATENT DOCUMENTS

| | | | |
|---|---|---|---|
| 5,465,583 A * | 11/1995 | Goode ..................... F17C 13/02 |
| 5,653,269 A * | 8/1997 | Miller et al. ............ F17C 13/02 |
| 5,808,204 A * | 9/1998 | Chang ..................... G01L 27/00 |
| 6,543,227 B2 * | 4/2003 | He et al. ........................... 60/602 |
| 6,711,934 B2 * | 3/2004 | Barbe ............................... 73/1.59 |
| 6,944,524 B2 * | 9/2005 | Shier et al. ..................... 700/301 |
| 7,316,651 B2 * | 1/2008 | Yang et al. ..................... 600/490 |
| 2002/0002856 A1 * | 1/2002 | Kenney et al. ................. 73/1.63 |
| 2004/0186630 A1 * | 9/2004 | Shier et al. ..................... 700/301 |
| 2009/0091180 A1 * | 4/2009 | Iwasaki et al. ................... 303/11 |
| 2010/0071438 A1 * | 3/2010 | Davis et al. ...................... 73/1.34 |
| 2010/0292544 A1 * | 11/2010 | Sherman et al. ............. 600/300 |
| 2012/0060583 A1 * | 3/2012 | Pechtold et al. ............... 73/1.57 |

FOREIGN PATENT DOCUMENTS

JP    2010174912 A * 8/2010 ............. F17C 13/02

* cited by examiner

Primary Examiner — Thomas P Noland
(74) Attorney, Agent, or Firm — John A. Miller; Miller IP Group, PLC (57) ABSTRACT

A method and system for automatically calibrating all pressure sensors in a hydrogen storage system for a fuel cell vehicle. A pressure regulator in the hydrogen storage system, which has much greater accuracy at low pressures, is used to calibrate the high-range pressure sensors used in the hydrogen storage system. This calibration can only be done when the pressure regulator is in a fully open position. In such a condition, the pressure sensors can be calibrated to the regulation pressure value of the regulator, thus greatly improving the accuracy of the readings of the high-range sensors at the low end of their range. The calibration can be performed during fuel cell operation under certain circumstances, performed during a programmed shutdown sequence, or performed in a service procedure.

20 Claims, 5 Drawing Sheets

CALIBRATION OF ALL PRESSURE TRANSDUCERS IN A HYDROGEN STORAGE SYSTEM

BACKGROUND OF THE INVENTION

1. Field of the Invention

This invention relates generally to calibration of pressure sensors for a hydrogen storage system and, more particularly, to a method and system for calibrating pressure sensors used in a hydrogen storage system for a fuel cell vehicle which uses a known pressure value which exists in the hydrogen storage system when a pressure regulator reaches a fully open position, and calibrates all pressure sensors in the hydrogen storage system to the known regulator pressure value in order to reduce the tolerance band at the low end of the range of the sensors.

2. Discussion of the Related Art

Fuel cell vehicles are expected to rapidly increase in popularity in the near future in the automotive marketplace. Fuel cell vehicles offer several desirable features, such as virtually pollution-free emissions, and avoiding vehicle usage of petroleum fuels. A key component of fuel cell vehicles is the hydrogen storage system, which stores the hydrogen used as a fuel by most fuel cell vehicles. Hydrogen storage systems typically consist of one or more interconnected pressure vessels for storing gaseous hydrogen, along with numerous valves, gauges, and fittings necessary for operation of the hydrogen storage system. Maximizing vehicle driving range, while fitting within packaging constraints and meeting regulatory requirements, is a key consideration in the design of hydrogen storage systems for fuel cell vehicles.

Fuel cells require a reliable source of hydrogen gas at a prescribed pressure. A pressure regulator is used to reduce the hydrogen gas from the high pressure at which it is stored in the vessels to the lower prescribed pressure required by the fuel cell. However, the pressure vessels used in hydrogen storage systems cannot tolerate rapid refilling from an excessively low hydrogen pressure, so the fuel cell in a vehicle must be shut down if the pressure in the hydrogen storage system reaches a minimum allowable pressure value. Unfortunately, pressure sensors capable of measuring the high hydrogen pressures typically seen in the vessels are not very accurate at low pressure ranges. Therefore, in current hydrogen storage systems, it cannot be precisely determined when the pressure in the hydrogen storage system has reached the minimum allowable pressure. As a result, a tolerance band must be applied to the pressure reading, and the fuel cell must be shut down when the pressure reading minus the tolerance value reaches the minimum allowable pressure.

There is a need for a calibration methodology for pressure sensors in a hydrogen storage system which improves the accuracy of the sensors at the low end of their range. Such a method would enable a more precise reading of hydrogen pressure when the storage vessels are nearly empty, thus eliminating the large tolerance band around the pressure reading, avoiding the premature shutdown of the fuel cell, and allowing significantly more hydrogen fuel to be used to power the vehicle. As a result, the vehicle will have a greater driving range between refueling stops, which is a real benefit to the driver.

SUMMARY OF THE INVENTION

In accordance with the teachings of the present invention, a method and system are disclosed for automatically calibrating all pressure sensors in a hydrogen storage system for a fuel cell vehicle. A pressure regulator in the hydrogen storage system, which has much greater accuracy at low pressures, is used to calibrate the high-range pressure sensors used in the hydrogen storage system. This calibration can only be done when the pressure regulator is in a fully open position. In such a condition, the pressure sensors can be calibrated to the regulation pressure value of the regulator, thus greatly improving the accuracy of the readings of the high-range sensors at the low end of their range. The calibration can be performed during fuel cell operation under certain circumstances, performed during a programmed shutdown sequence, or performed in a service procedure.

Additional features of the present invention will become apparent from the following description and appended claims, taken in conjunction with the accompanying drawings.

DETAILED DESCRIPTION OF THE EMBODIMENTS

The following discussion of the embodiments of the invention directed to calibration of pressure sensors in a hydrogen storage system is merely exemplary in nature, and is in no way intended to limit the invention or its applications or uses. For example, the disclosed methods and systems have particular application to a hydrogen storage system for a fuel cell vehicle, but may also be applicable to calibration of pressure sensors in any gas storage or gas handling system.

Fuel cells can be designed to use a variety of fuels, but the fuel cells being developed for most automotive applications use hydrogen gas as a fuel. Such fuel cells require a reliable source of hydrogen gas, typically provided by a hydrogen storage system.

Figure 1:
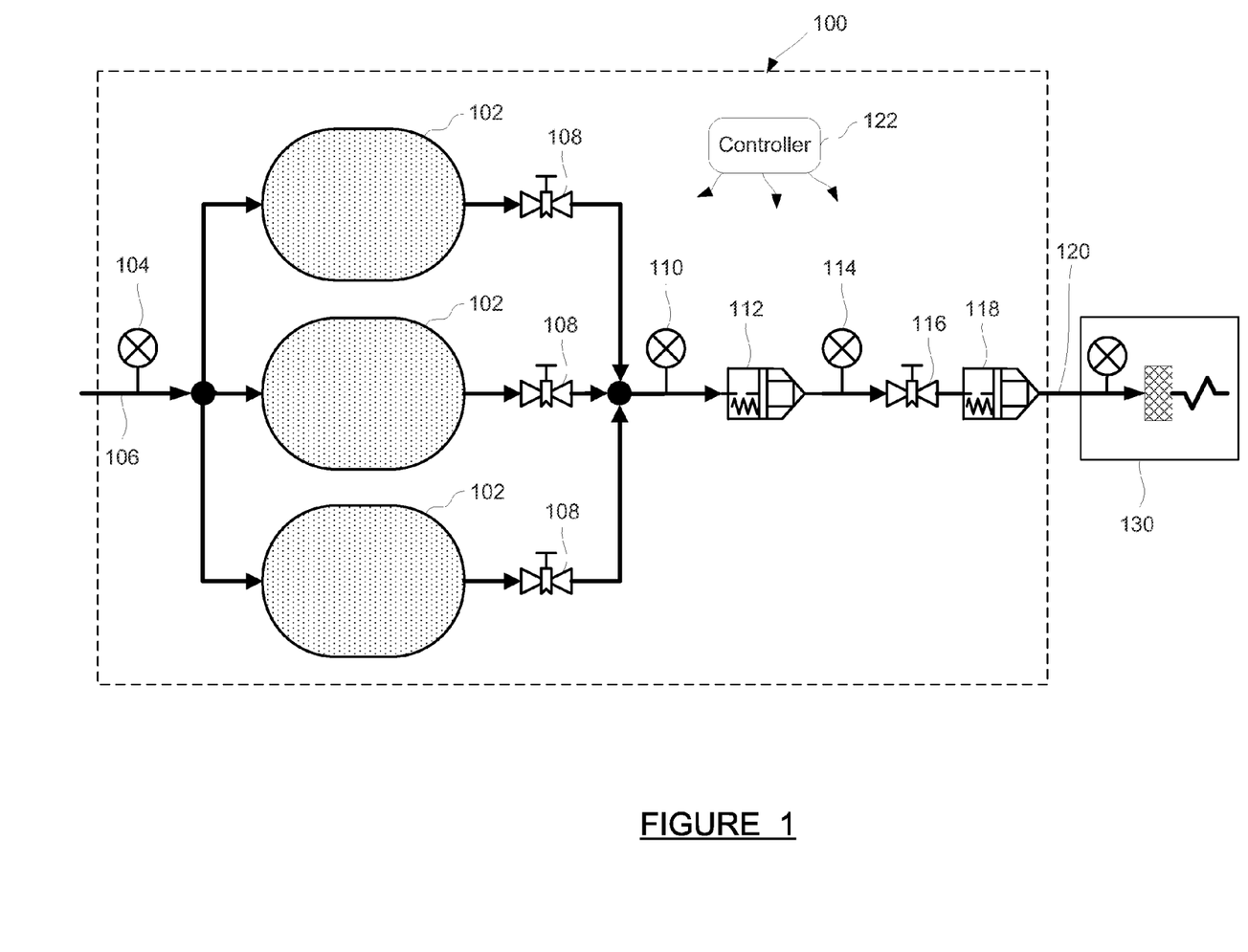
FIG. 1 is a schematic diagram of a hydrogen storage system for a fuel cell.

FIG. 1 is a schematic diagram of a hydrogen storage system 100 for a fuel cell 130. Pressure vessels 102 store hydrogen gas at a high pressure. More or fewer of the pressure vessels 102 could be used than the three shown in the hydrogen storage system 100. A pressure sensor 104 measures the pressure at a filler line 106 which is used to fill the vessels 102 from an external supply (not shown). Shut-off valves 108 are situated just downstream from each of the pressure vessels 102. The terms upstream and downstream are used throughout this disclosure with respect to the direction of flow from the pressure vessels 102 to the fuel cell 130. A pressure sensor 110 measures the hydrogen pressure between the shut-off valves 108 and a pressure regulator 112. The pressure regulator 112 is used to reduce the pressure of the hydrogen gas from the high pressure of the vessels 102 down to a lower pressure which is near that required by the fuel cell 130.

A pressure sensor 114 measures the hydrogen pressure downstream of the regulator 112 and upstream of a shut-off valve 116. The shut-off valve 116 can be closed to completely isolate the hydrogen storage system 100 from the fuel cell 130. A second pressure regulator 118 is used to reduce the hydrogen gas pressure down to the low pressure required by the fuel cell 130. Fuel supply line 120 connects the hydrogen storage system 100 to the fuel cell 130. A controller 122—in communication with the valves 108, the sensors 104, 110, and 114, the regulators 112 and 118, the valve 116, and the fuel cell 130—can be used to monitor conditions in the hydrogen storage system 100 and the fuel cell 130, and control a calibration sequence as discussed below. For simplicity, the details of the components of the fuel cell 130 are omitted, as are various filters, check valves, relief valves, and other components of the hydrogen storage system 100.

The pressure of the hydrogen gas contained in the pressure vessels 102 can be as much as 700 bar or even higher. As a result, a high-range transducer or sensor must be used for at least the pressure sensors 104 and 110, and high-range sensors inherently have a high tolerance band around their pressure readings, which can be especially problematic for pressure readings at the low end of their range. A typical pressure transducer or pressure sensor, such as the pressure sensors 104, 110, and 114, consists of a membrane and possibly several electronic components configured such that an output voltage signal is produced which is proportional to the pressure differential being experienced by the membrane. Each of the components of the sensors 104, 110, and 114 has a base tolerance which can be represented as a plus or minus pressure variance. In addition, each of the components also experiences long-term drift, which further impacts the accuracy of the sensors 104, 110, and 114. When all of the tolerances of the components are added up, a typical high-range pressure transducer or sensor, such as the pressure sensors 104, 110, and 114, can have tolerances of +/−30 bar or higher.

The high tolerance band creates a problem for the hydrogen storage system 100, because the high tolerance band on the pressure readings at the pressure sensors 104, 110, and 114 make it difficult to accurately determine how much hydrogen actually remains in the vessels 102. For reliability reasons, the pressure vessels 102 are designed to be pressurized once to a certain level, and henceforth the pressure in the vessels 102 should not be allowed to drop below a certain minimum allowable pressure. For example, the vessels 102 may have a minimum allowable pressure of 20 bar. If the pressure sensor 104 has a tolerance of +/−30 bar, then the minimum allowable pressure of 20 bar could possibly be reached when the pressure sensor 104 reads 50 bar (20 bar actual pressure plus 30 bar tolerance). Therefore, with a +/−30 bar tolerance around readings at the sensor 104, the hydrogen storage system 100 would have to be designed to shut down when the pressure reading at the sensor 104 reaches 50 bar in order to protect the vessels 102. However, due to the uncertainty of the pressure reading at the sensor 104, the actual pressure remaining in the vessels 102 may be as high as 80 bar (the 50 bar reading plus the 30 bar tolerance) in such a situation. The result of all of this is that the hydrogen storage system 100 and the fuel cell 130 will have to be designed to shut down when, in most cases, a significant usable amount of hydrogen still remains in the vessels 102.

The minimum allowable pressure of 20 bar is also prescribed in order to keep the volume flow rate below a reasonable limit while achieving a mass flow rate required to operate the fuel cell 130 at full power. Without the minimum allowable pressure limit, the high volume flow rates experienced during low vessel pressure conditions would require larger pipes and fittings throughout the hydrogen storage system 100.

As discussed above, the pressure sensors 104, 110, and 114 are of a high-range design, and will typically have a tolerance of around +/−30 bar, which significantly affects the accuracy of pressure readings, and becomes especially problematic at the low end of the sensors' range. However, a pressure regulator, such as the regulator 112, may have a tolerance of only about +/−5 bar around its regulation pressure. This fact can be used to the advantage of the hydrogen storage system 100, by calibrating the pressure sensors 104, 110, and 114 against the pressure regulator 112. This can be done at the moment the pressure regulator 112 reaches a fully open position under low pressure conditions.

In the case of a +/−30 bar tolerance, the actual pressure in the vessels 102 could be anywhere between 20 and 80 bar when the fuel cell 130 needs to be shut down due to minimum allowable pressure. In contrast, in the case of a +/−5 bar tolerance, as would be achieved after calibration of the pressure sensors 104, 110, and 114 against the pressure regulator 112, the actual pressure in the vessels 102 could be anywhere between 20 and 30 bar when shutdown is required. The extra 50 bar of usable hydrogen pressure (80 bar minus 30 bar) represents significant extra range for the vehicle which is being powered by the fuel cell 130.

Figure 2:
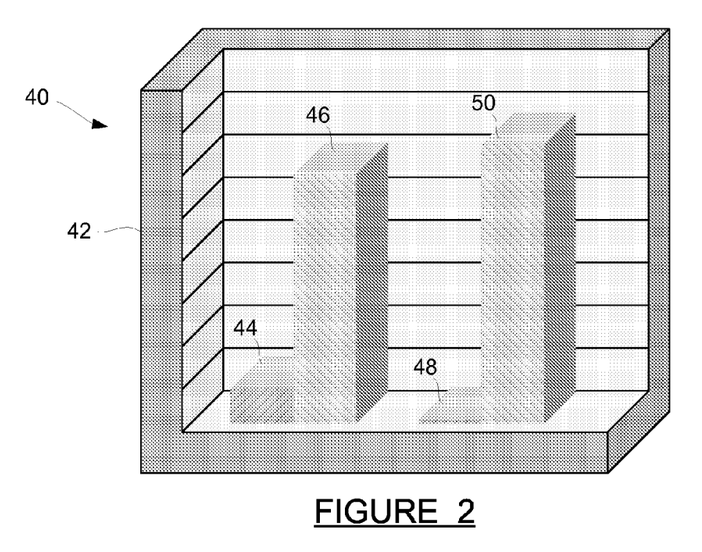
FIG. 2 is a bar chart showing how the driving range of a fuel cell vehicle can be improved by pressure sensor calibration.

FIG. 2 is a bar chart 40 showing how the driving range of a fuel cell vehicle can be improved by pressure sensor calibration. Vertical axis 42 represents driving range. Bar 44 shows the loss of range experienced due to high tolerances in pressure readings, in a typical fuel cell vehicle with no pressure sensor calibration. Bar 46 shows the total driving range of the same typical fuel cell vehicle. Bar 48 shows the loss of range which would be experienced by a fuel cell vehicle in which pressure sensor calibration is carried out as discussed above. Bar 50 shows the total driving range of the fuel cell vehicle in which pressure sensor calibration is carried out. It can be seen that the loss of driving range is significantly reduced between the bar 44 and the bar 48, while total driving range is increased by the same amount from the bar 46 to the bar 50. While the bar chart 40 is provided without a mileage scale, it is noted that a driving range increase of 50 miles is possible, in a vehicle with a nominal driving range of 350-400 miles, through pressure sensor calibration.

The calibration of the pressure sensors 104, 110, and 114 can be accomplished by setting the pressure sensor values equal to the known regulation pressure of the regulator 112 in the circumstance where the regulator 112 has just reached a fully open position. This circumstance will arise when the amount of hydrogen remaining in the vessels 102 is low enough to allow the pressure at the sensor 110 to drop to the regulation pressure of the regulator 112. At that moment, the sensors 110 and 114 can be calibrated to the regulation pressure of the regulator 112, as the pressure drop between the sensors 110 and 114 will be negligible. Then the sensor 104 can be statically calibrated to the sensor 110 the next time the fuel cell 130 is shut down by closing the shut-off valve 116.

As would be understood by one skilled in the art, calibrating a first pressure sensor against, or to, a second pressure sensor means adjusting the reading of the first pressure sensor to match the reading of the second pressure sensor. In other words, the second pressure sensor is believed to be more accurate, so the first pressure sensor is adjusted to match it.

Figure 3:
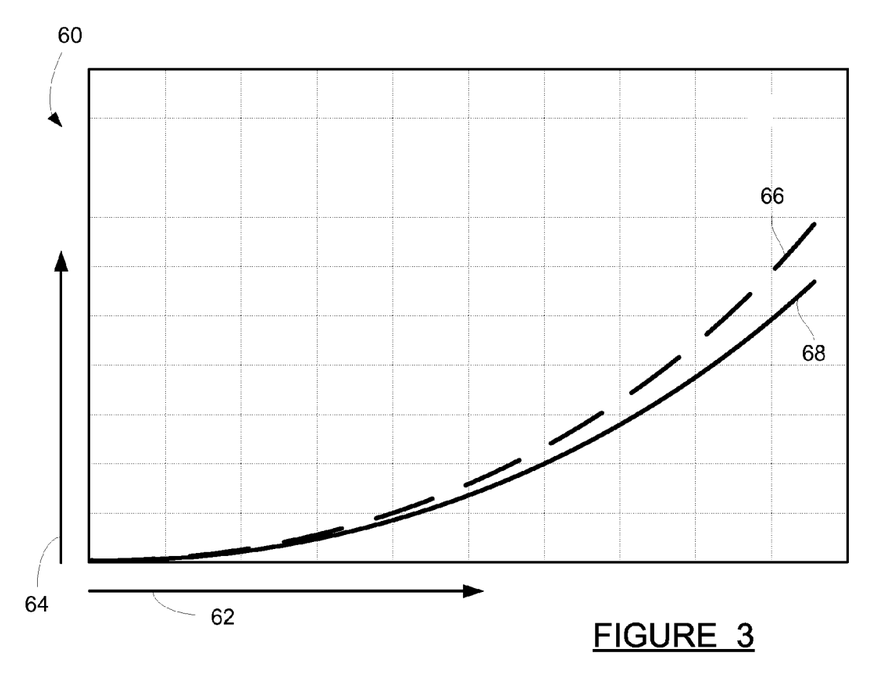
FIG. 3 is a graph showing how the pressure drop between two pressure sensors can be computed for various flow rate and pressure conditions.

Even if the fuel cell 130 is not shut down, and hydrogen gas is flowing through the regulator 112, the pressure sensor 104 can be calibrated to the pressure sensor 110 by accounting for the pressure drop between the two. FIG. 3 is a graph 60 showing how the pressure drop between the pressure sensor 104 and the pressure sensor 110 can be computed for various flow rate and pressure conditions. Horizontal axis 62 represents mass flow rate of hydrogen gas through the regulator 112. Vertical axis 64 represents pressure drop between the sensor 104 and the sensor 110. Curve 66 shows the pressure drop as a function of mass flow rate when the pressure at the sensor 110 is 30 bar. Curve 68 shows the pressure drop as a function of mass flow rate when the pressure at the sensor 110 is 50 bar. The data contained on the graph 60 can be measured across the range of pressures and mass flow rates expected at the pressure sensor 110, thus allowing the calibration of the pressure sensor 104 while hydrogen gas is flowing to the fuel cell 130. It is noted that the curves 66 and 68 depict theoretical pressure drops due to flow; as-measured pressure drops may exhibit a static offset (pressure reading difference at zero flow), due to the tolerance bands described above. Finally, check valves in the hydrogen storage system 100 may cause a real static pressure differential between the sensors 104 and 110.

Figure 4:
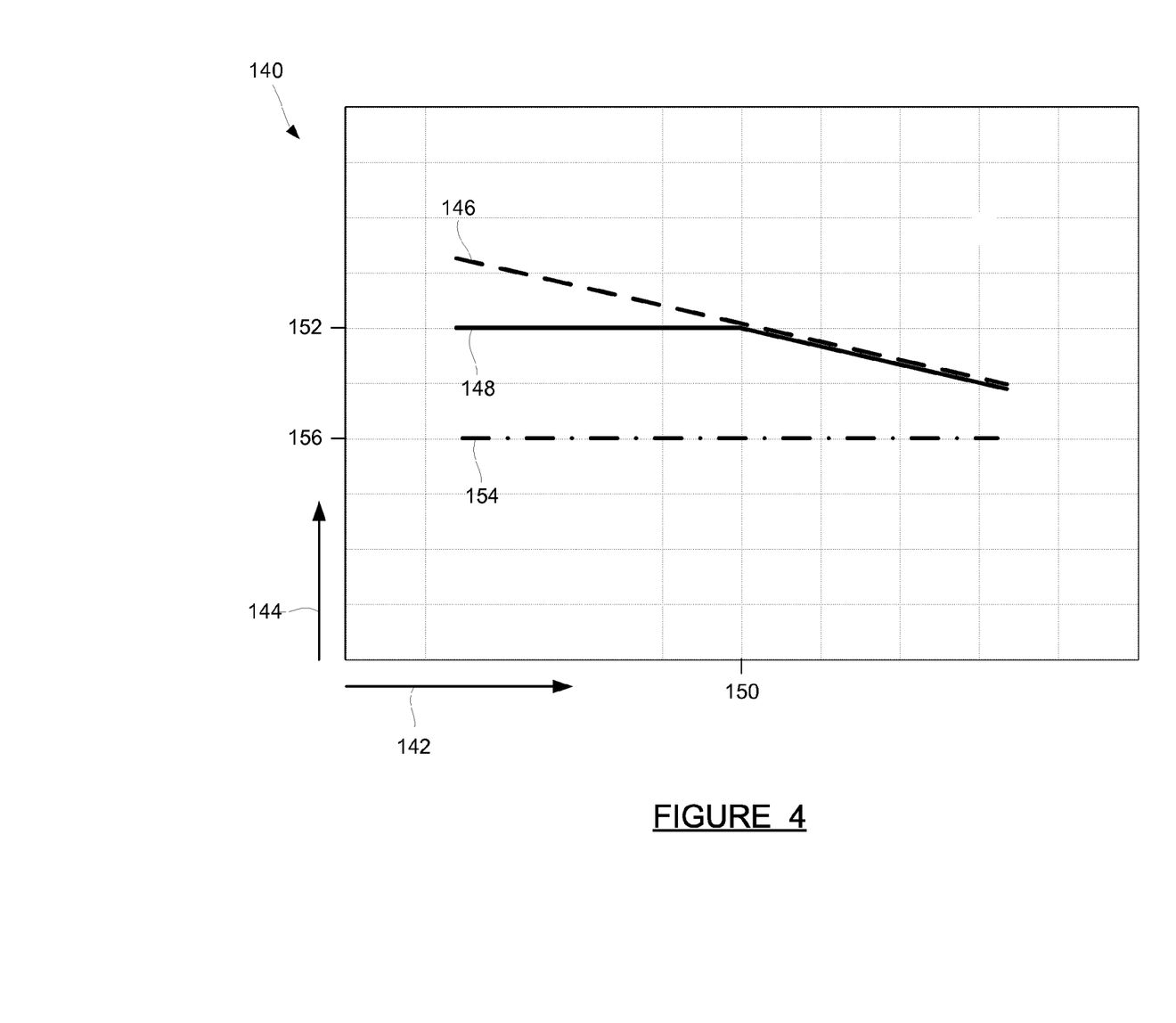
FIG. 4 is a graph showing how the pressure readings at two pressure sensors can be calibrated to each other when a pressure regulator situated between the two sensors reaches a fully open position.

FIG. 4 is a graph 140 showing pressure readings at the pressure sensors 110 and 114 as the pressure regulator 112 reaches a fully open position. Horizontal axis 142 represents time, while vertical axis 144 represents pressure. Curve 146 shows the pressure reading at the pressure sensor 110, that is, the pressure upstream of the pressure regulator 112. Curve 148 shows the pressure reading at the pressure sensor 114, that is, the pressure downstream of the pressure regulator 112. On the left side of the graph 140—to the left of time mark 150—the pressure at the sensor 110, shown by the curve 146, is slightly above the regulation pressure of the regulator 112 and slowly decreasing; this would occur if the pressure vessels 102 have only a small amount of hydrogen remaining and the fuel cell 130 is in operation and consuming hydrogen fuel. Meanwhile, the pressure at the sensor 114, shown by the curve 148, remains constant at the regulation pressure of the regulator 112, designated by pressure mark 152.

At the time mark 150, the pressure at the sensor 110 reaches the regulation pressure of the regulator 112. At this moment, the regulator 112 is fully open, and the pressure at the sensor 114, shown by the curve 148, begins to drop. At the moment that the pressure at the sensor 114 begins to drop, that is, at the time mark 150, the pressure readings at the sensors 110 and 114 can be calibrated to the known regulation pressure of the regulator 112, that is, the value indicated by the pressure mark 152. As mentioned above, the regulator 112 may, for example, have a regulation pressure of +/−5 bar, which is significantly more accurate than the tolerance band of +/−30 bar which is typical of the pressure sensors 104, 110, and 114.

On the graph 140, line 154 represents the minimum allowable pressure in the hydrogen storage system 100, indicated by pressure mark 156. In a typical example, the pressure mark 152 has a value of about 30 bar, while the pressure mark 156 has a value of about 20 bar. This indicates that the calibration described above can be carried out while the fuel cell 130 is in operation.

Although the curves 146 and 148 are shown slightly separated on the graph 140 for clarity, in the situation where the pressure regulator 112 is fully open, there is very little pressure drop between the pressure sensors 110 and 114, even when hydrogen gas is flowing to the fuel cell 130. Therefore, the pressure readings at the sensors 110 and 114 can accurately be equated to the regulation pressure of the regulator 112.

Figure 5:
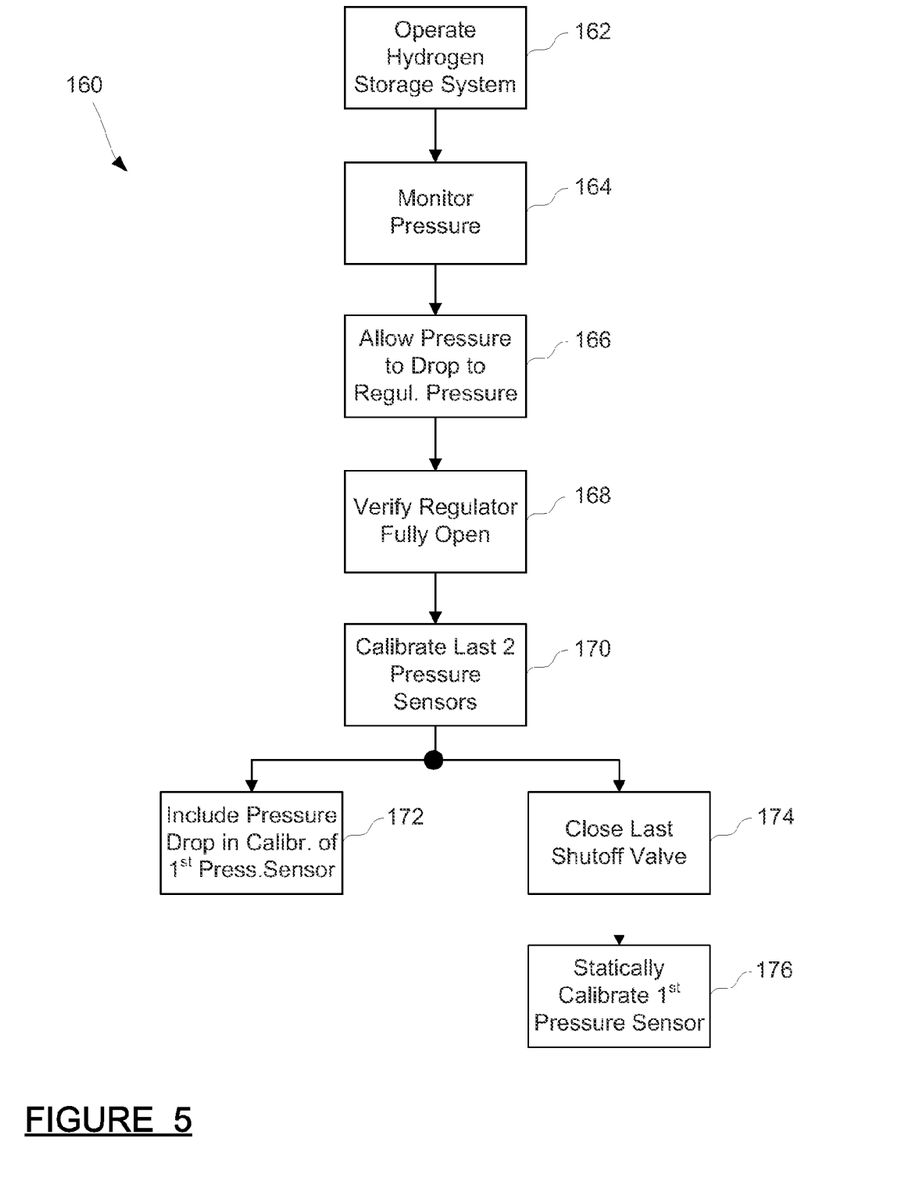
FIG. 5 is a flow chart diagram of a method that can be used to calibrate all high-range pressure sensors in the hydrogen storage system of FIG. 1.

FIG. 5 is a flow chart diagram 160 of a method that can be used to calibrate the pressure sensors 104, 110, and 114 against the regulation pressure of the regulator 112. At box 162, the hydrogen storage system 100 is operated with the valves 108 and 116 open, providing hydrogen fuel to the fuel cell 130. At box 164, the pressure at the sensors 110 and 114 is monitored by the controller 122. At box 166, the pressure at the sensor 110 is allowed to drop to the regulation pressure of the regulator 112, as would happen if the vessels 102 were nearly empty. At box 168, the controller 122 verifies that the regulator 112 is fully open by detecting a drop in pressure from the previously constant value at the sensor 114. At box 170, the pressure sensors 110 and 114 are calibrated by setting their output values equal to the known regulation pressure of the regulator 112. The activities of the boxes 162-170 can all take place while the fuel cell 130 is operating and the host vehicle is being driven, if the pressure in the vessels 102 drops to the regulation pressure of the regulator 112.

The calibration process can be carried out while the fuel cell 130 is operating and hydrogen gas is flowing. In this circumstance, calibration of the pressure sensor 104 can be completed at box 172, by accounting for the pressure drop between the sensors 104 and 110, as described previously. If a static calibration of the pressure sensor 104 is desired, then additional steps can be performed as follows. At box 174, the shut-off valve 116 is closed to stop the flow of hydrogen gas from the hydrogen storage system 100 to the fuel cell 130. The valves 108 must remain open at the box 174. At box 176, the pressure sensor 104 is calibrated by setting its output value equal to the pressure reading of the pressure sensor 110 plus any static pressure offset as appropriate. A wait time, such as 5-10 seconds, may be included at the box 176, to allow static equilibrium pressure to be reached throughout the hydrogen storage system 100. The static calibration of the pressure sensor 104 can be carried out at any convenient time after the pressure sensor 110 has been calibrated. For example, the calibration at the box 176 could be done after the fuel cell 130 has been shut down due to vehicle inactivity. Thus, it is important that the sensor 104 be calibrated against the sensor 110, not against the regulation pressure of the regulator 112, because the system pressure may have changed from the regulation pressure by the time the calibration is completed at the box 176.

It is possible that some fuel cell vehicle drivers will seldom or never allow their vehicle to run very low on hydrogen fuel. Therefore, in these vehicles there may rarely if ever be an occasion where the pressure in the vessels 102 decreases to the regulation pressure of the regulator 112. To achieve the benefits of pressure sensor calibration, a method of calibration is needed which does not require the pressure vessels 102 to be nearly empty. Such a method can be devised by closing the shut-off valves 108 and allowing the fuel cell 130 to continue to operate; this will consume the hydrogen fuel downstream of the shut-off valves 108, thus causing the pressure at the sensor 110 to drop through the regulation pressure of the regulator 112.

Figure 6:
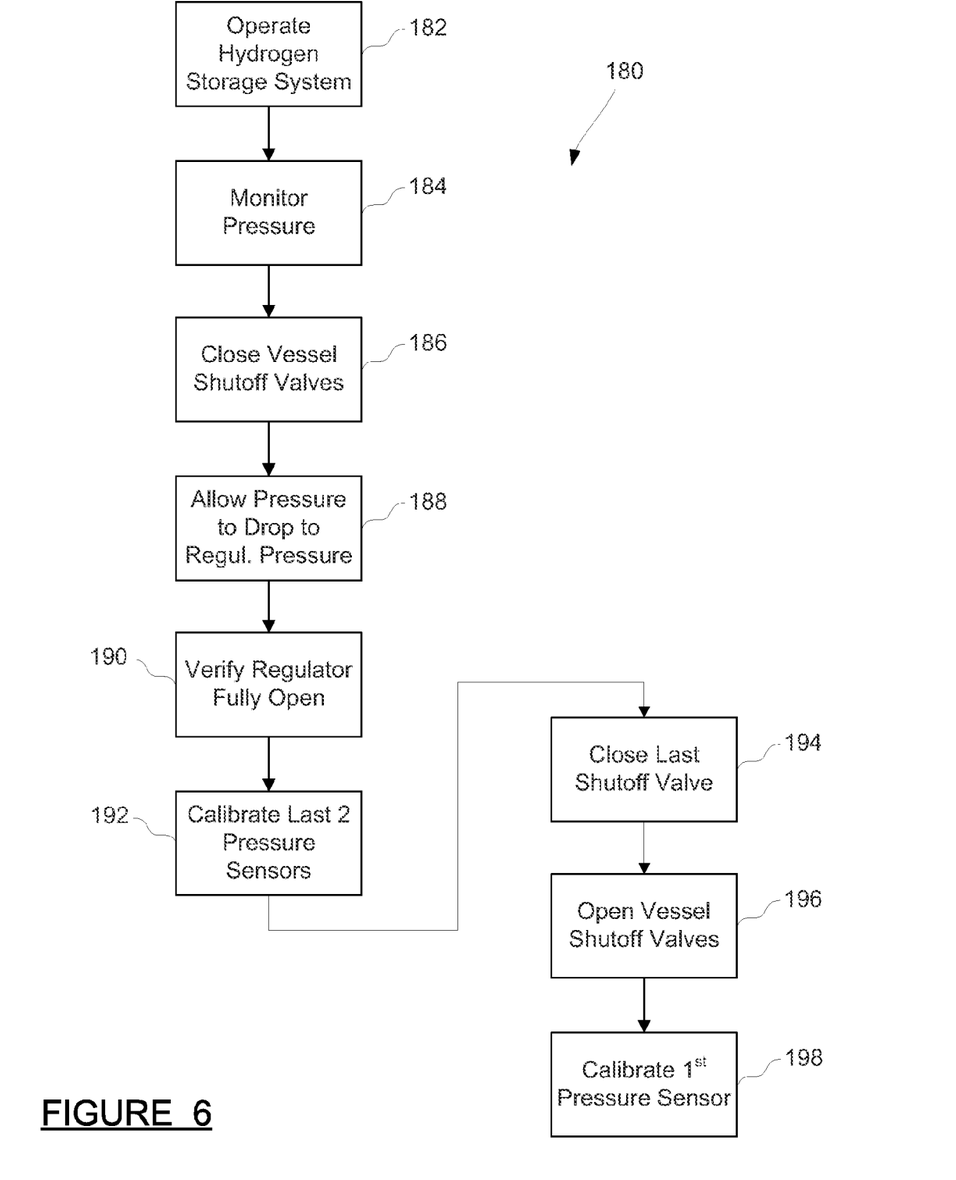
FIG. 6 is a flow chart diagram of a method that can be used to calibrate all high-range pressure sensors in the hydrogen storage system of FIG. 1, regardless of the amount of hydrogen contained in the pressure vessels of the hydrogen storage system.

FIG. 6 is a flow chart diagram 180 of a method that can be used to calibrate the pressure sensors 104, 110, and 114, regardless of the amount of hydrogen contained in the pressure vessels 102. At box 182, the hydrogen storage system 100 is operated with the valves 108 and 116 open, providing hydrogen fuel to the fuel cell 130. At box 184, the pressure at the sensors 110 and 114 is monitored by the controller 122. At box 186, the shut-off valves 108 are closed, preventing the flow of hydrogen downstream from the vessels 102. At box 188, the pressure at the sensor 110 is allowed to drop to the regulation pressure of the regulator 112, which will happen quickly with the valves 108 closed. At box 190, the controller 122 verifies that the regulator 112 is fully open by detecting a drop in pressure from the previously constant value at the sensor 114. At box 192, the pressure sensors 110 and 114 are calibrated by setting their output values equal to the known regulation pressure of the regulator 112. The activities of the boxes 182-192 could conveniently be completed while the fuel cell 130 is being shut down after the host vehicle has been parked.

At this point in the process, the valves 108 are closed, so the pressure sensor 104 cannot be calibrated to the value of the pressure sensor 110. Additional steps are required to calibrate the sensor 104. At box 194, the shut-off valve 116 is closed to stop the flow of hydrogen gas from the hydrogen storage system 100 to the fuel cell 130. At box 196, the valves 108 are opened, thus putting the sensor 104 and the vessels 102 back in fluid communication with the sensor 110. At box 198, the pressure sensor 104 is calibrated by setting its output value equal to the pressure reading of the pressure sensor 110 plus any static pressure offset as appropriate. A wait time, such as 5-10 seconds, may be included at the box 198, to allow static equilibrium pressure to be reached throughout the hydrogen storage system 100. The static calibration of the pressure sensor 104 can be carried out at any convenient time after the pressure sensor 110 has been calibrated, including immediately after, while the valve 116 is closed.

It may be desirable to configure the controller 122 so that the calibration of the pressure sensor 104 is performed at a time when the pressure in the vessels 102 is relatively low. This would offer the advantage of calibrating the sensor 104 near the low end of its range, thus improving the accuracy of low-end readings which are important for preventing the pressure in the vessels 102 from dropping below the minimum allowable pressure. In this case, the steps included in the boxes 194-198 would remain the same, but they would be initiated when pressure in the vessels 102 is suitably low—for example, below 100 bar.

Throughout the discussion of the calibration processes shown on the flow chart diagrams 160 and 180, it is to be understood that the pressure sensors 104, 110, and 114 are of a type that can be calibrated in a non-manual fashion, such as by the controller 122. For example, the controller 122 would know the regulation pressure of the regulator 112, as this is a fixed value with a relatively small tolerance. At the appropriate moment in time at the box 170, for example, the controller 122 could send a signal to the pressure sensors 110 and 114 to set their output pressure reading values equal to the known regulation pressure. Digital or analog/digital pressure transducer devices with this type of calibration capability are commonly available.

Other calibration scenarios are also possible—including calibrating the pressure sensor 104 against a known external reference during refueling or service operations. These other scenarios achieve the goal of pressure sensor calibration, but they cannot be performed autonomously by the onboard vehicle systems. In one scenario for pressure sensor calibration of the hydrogen storage system 100, the external high-pressure hydrogen supply (not shown on figures) would be attached to the filling line 106, so that the vessels 102 could be filled to a high pressure with hydrogen. Either before or after the filling of the vessels 102, if the external supply system was equipped with an accurately calibrated pressure sensor (not shown), the external supply system's sensor could be used to calibrate the pressure sensor 104. The pressure sensor 104 could then be used to calibrate the sensors 110 and 114.

In another scenario involving the hydrogen storage system 100, a service procedure could be carried out, where an accurately calibrated external pressure sensor (not shown in figures) is attached to the filling line 106, and the pressure sensor 104 is calibrated against the value of the external sensor. The service procedure could be extended to prescribe the closing of the shut-off valve 116, such that all three pressure sensors (104, 110, and 114) can be statically calibrated against the external pressure sensor. The service procedure could include dropping the pressure in the hydrogen storage system 100 to the minimum allowable pressure before calibration, thus providing the greatest pressure sensor accuracy at the low end of the sensors' range.

Using any of the calibration methods described above, the accuracy of the pressure sensors used in hydrogen storage systems for fuel cell vehicles can be greatly improved. In particular, the disclosed fully autonomous methods and systems enable calibration of the onboard pressure sensors on an as-needed basis without external intervention. The increased accuracy of the pressure sensors allows a greater percentage of the onboard hydrogen fuel supply to be used, thus increasing vehicle driving range and customer satisfaction.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for calibrating pressure sensors in a gas storage system, said gas storage system including one or more pressure vessels for storing a gas, where the gas is provided by the gas storage system to a downstream device, said method comprising:
    operating the gas storage system and the downstream device;
    monitoring pressure of the gas at a first pressure sensor, a second pressure sensor, and a third pressure sensor;
    allowing the pressure of the gas at the second pressure sensor to drop to a regulation pressure of a pressure regulator which is located between the second pressure sensor and the third pressure sensor;
    verifying that the pressure regulator is fully open; and
    calibrating the second pressure sensor and the third pressure sensor to the regulation pressure of the pressure regulator.

2. The method of claim 1 wherein allowing the pressure of the gas at the second pressure sensor to drop to a regulation pressure of a pressure regulator includes operating the gas storage system until the pressure of the gas in the one or more pressure vessels drops to the regulation pressure of the pressure regulator.

3. The method of claim 1 wherein allowing the pressure of the gas at the second pressure sensor to drop to a regulation pressure of a pressure regulator includes closing vessel shut-off valves located downstream of each of the one or more pressure vessels to cause the pressure of the gas downstream of the vessel shut-off valves to drop.

4. The method of claim 1 wherein verifying that the pressure regulator is fully open includes detecting a drop in pressure at the third pressure sensor.

5. The method of claim 1 wherein verifying that the pressure regulator is fully open includes receiving a signal from the pressure regulator indicating that the pressure regulator is fully open.

6. The method of claim 1 further comprising calibrating the first pressure sensor to the second pressure sensor.

7. The method of claim 6 wherein calibrating the first pressure sensor to the second pressure sensor includes adjusting for a pressure drop between the first pressure sensor and the second pressure sensor.

8. The method of claim 6 wherein calibrating the first pressure sensor to the second pressure sensor includes closing a system shut-off valve located downstream of the second pressure sensor, and allowing the pressure of the gas to reach static equilibrium between the first pressure sensor and the second pressure sensor.

9. The method of claim 1 wherein gas is hydrogen and the downstream device is a fuel cell system.

10. The method of claim 9 wherein the fuel cell system is used to power a vehicle.

11. A method for calibrating pressure sensors in a hydrogen storage system for a fuel cell, said hydrogen storage system including one or more pressure vessels for storing hydrogen gas, where the hydrogen gas is provided by the hydrogen storage system to the fuel cell, said method comprising:
   operating the hydrogen storage system and the fuel cell;
   monitoring pressure of the hydrogen gas at a first pressure sensor, a second pressure sensor, and a third pressure sensor;
   allowing the pressure of the hydrogen gas at the second pressure sensor to drop to a regulation pressure of a pressure regulator which is located between the second pressure sensor and the third pressure sensor;
   verifying that the pressure regulator is fully open;
   calibrating the second pressure sensor and the third pressure sensor to the regulation pressure of the pressure regulator; and
   calibrating the first pressure sensor to the second pressure sensor.

12. The method of claim 11 wherein allowing the pressure of the hydrogen gas at the second pressure sensor to drop to a regulation pressure of a pressure regulator includes operating the hydrogen storage system until the pressure of the hydrogen gas in the one or more pressure vessels drops to the regulation pressure of the pressure regulator.

13. The method of claim 11 wherein verifying that the pressure regulator is fully open includes detecting a drop in pressure at the third pressure sensor.

14. The method of claim 11 wherein calibrating the first pressure sensor to the second pressure sensor includes adjusting for a pressure drop between the first pressure sensor and the second pressure sensor.

15. A self-pressure-calibrating gas storage system, said gas storage system providing a gas to a downstream device, said gas storage system comprising:
   one or more pressure vessels for storing the gas;
   a vessel shut-off valve for each of the pressure vessels;
   a first pressure sensor for measuring pressure of the gas in the pressure vessels;
   a pressure regulator for reducing the pressure of the gas from the pressure vessels to a regulation pressure;
   a second pressure sensor located upstream of the pressure regulator;
   a third pressure sensor located downstream of the pressure regulator;
   a system shut-off valve located downstream of the pressure regulator; and
   a controller in communication with the pressure sensors, the shut-off valves, and the pressure regulator, said controller being configured to receive signals from the pressure sensors, the shut-off valves, and the pressure regulator, control opening and closing of the shut-off valves, and calibrate the pressure sensors.

16. The gas storage system of claim 15 wherein the controller is configured to calibrate the second pressure sensor and the third pressure sensor to the regulation pressure of the pressure regulator when the pressure regulator is in a fully open position.

17. The gas storage system of claim 16 wherein the controller determines that the pressure regulator is in the fully open position by detecting a pressure drop at the third pressure sensor.

18. The gas storage system of claim 15 wherein the controller is configured to calibrate the first pressure sensor to the second pressure sensor after the second pressure sensor has been calibrated.

19. The gas storage system of claim 18 wherein the controller closes the system shut-off valve and allows the pressure of the gas to reach static equilibrium before calibrating the first pressure sensor to the second pressure.

20. The gas storage system of claim 15 wherein the downstream device is a fuel cell system which is used to power a vehicle.

* * * * *